(12) United States Patent
Scarpa

(10) Patent No.: US 7,209,433 B2
(45) Date of Patent: Apr. 24, 2007

(54) CHANNEL ESTIMATION AND COMPENSATION TECHNIQUES FOR USE IN FREQUENCY DIVISION MULTIPLEXED SYSTEMS

(75) Inventor: Carl Scarpa, Plainsboro, NJ (US)

(73) Assignee: Hitachi, Ltd., Tokyo (JP)

( * ) Notice: Subject to any disclaimer, the term of this patent is extended or adjusted under 35 U.S.C. 154(b) by 946 days.

(21) Appl. No.: 10/041,082

(22) Filed: Jan. 7, 2002

(65) Prior Publication Data
US 2003/0128656 A1 Jul. 10, 2003

(51) Int. Cl.
*H04J 11/00* (2006.01)
*H04J 3/12* (2006.01)

(52) U.S. Cl. ............. 370/206; 370/252; 370/526; 375/235; 375/298

(58) Field of Classification Search ............... 370/203, 370/209, 210, 252, 522, 526; 375/232, 234, 375/239, 316, 340, 350, 362–364
See application file for complete search history.

(56) References Cited

U.S. PATENT DOCUMENTS

| | | | |
|---|---|---|---|
| 5,131,006 A | 7/1992 | Kamerman et al. | |
| 5,170,415 A | 12/1992 | Yoshida et al. | |
| 5,206,886 A | 4/1993 | Bingham | |
| 5,272,446 A | 12/1993 | Chalmers et al. | |
| 5,406,551 A | 4/1995 | Saito et al. | |
| 5,448,601 A | 9/1995 | Choi | 375/232 |
| 5,471,508 A * | 11/1995 | Koslov | 375/344 |
| 5,483,529 A | 1/1996 | Baggen et al. | 370/70 |
| 5,502,506 A | 3/1996 | Choi | 348/607 |
| 5,732,113 A | 3/1998 | Schmidl et al. | |
| 5,809,083 A * | 9/1998 | Wright | 375/285 |
| 5,835,731 A | 11/1998 | Werner et al. | 375/235 |

(Continued)

FOREIGN PATENT DOCUMENTS

EP 0 844 765 A2 5/1998

(Continued)

OTHER PUBLICATIONS

H. Ochiai, "Performance Analysis of Deliberately Clipped OFDM Signals", IEEE Transactions on Communications, vol. 50, No. 1, Jan. 2002, pp. 89-101.

(Continued)

*Primary Examiner*—Doris H. To
*Assistant Examiner*—Soon D. Hyun
(74) *Attorney, Agent, or Firm*—Straub & Pokotylo; Michael P. Straub

(57) ABSTRACT

Methods and apparatus for performing channel estimate updates in frequency division multiplexed, e.g., (OFDM), systems are described. After generation of initial channel estimates from received pilots, channel estimates corresponding to individual tones are updated using any one of a plurality of update techniques including, e.g., a constant modulus based method and a reduced constellation decision directed update method. The channel estimate update technique to be used with for an individual tone is selected based on a comparison of a signal noise measurement to one or more thresholds. The channel estimate update technique applied to different tones of the OFDM signal at the same time may vary. Over time, as the level of noise is reduced, the channel estimate update technique will switch from an interpolated pilot method, to a constant modulus algorithm based method, to a reduced constellation decision directed method, to a full constellation decision directed update method.

13 Claims, 7 Drawing Sheets

U.S. PATENT DOCUMENTS

| | | | |
|---|---|---|---|
| 5,848,105 A | 12/1998 | Gardner et al. | 375/336 |
| 5,912,876 A | 6/1999 | H'mimy | 370/210 |
| 6,035,003 A | 3/2000 | Park et al. | |
| 6,128,276 A | 10/2000 | Agee | 370/208 |
| 6,134,286 A | 10/2000 | Chennakeshu et al. | |
| 6,181,714 B1 | 1/2001 | Isaksson et al. | |
| 6,198,782 B1 | 3/2001 | DeCourville et al. | |
| 6,219,334 B1 | 4/2001 | Sato et al. | 370/210 |
| 6,292,135 B1 | 9/2001 | Takatori et al. | 342/383 |
| 6,295,326 B1 | 9/2001 | Tonissen et al. | 375/350 |
| 6,317,470 B1 | 11/2001 | Kroeger et al. | |
| 6,393,068 B1 * | 5/2002 | Rupp | 375/326 |
| 6,563,786 B1 * | 5/2003 | Nee | 370/208 |
| 6,625,111 B1 * | 9/2003 | Sudo | 370/203 |
| 6,680,967 B1 * | 1/2004 | Westman | 375/148 |
| 2001/0021182 A1 | 9/2001 | Wakutsu | 370/344 |
| 2002/0001352 A1 | 1/2002 | Stirling-Gallacher et al. | |
| 2002/0034213 A1 | 3/2002 | Wang et al. | |
| 2002/0037057 A1 | 3/2002 | Kroeger et al. | |
| 2002/0039383 A1 * | 4/2002 | Zhu et al. | 375/214 |
| 2003/0114164 A1 * | 6/2003 | Thomas et al. | 455/452 |

FOREIGN PATENT DOCUMENTS

| | | |
|---|---|---|
| EP | 1 178 630 A1 | 2/2002 |
| EP | 1 178 640 A1 | 2/2002 |
| EP | 1 178 642 A2 | 2/2002 |
| JP | 10303852 A | 11/1998 |
| JP | 2001-136149 | 5/2001 |
| WO | WO 02/23781 A1 | 3/2002 |

OTHER PUBLICATIONS

C. W. Wong, C. L. Law, Y. L. Guan, "Channel Estimator for OFDM Systems with 2-Dimensional Filtering in the Transform Domain", Nanyang Technological University, 2001, pp. 717-721.

J. K. Moon and S. I. Choi, "Performance of Channel Estimation Methods for OFDM Systems in a Multipath Fading Channels", IEEE, 2000, pp. 161-170.

T. Onizawa, M. Mizoguchi, T. Sakata and M. Morikura, "A Simple Adaptive Channel Estimation Scheme for OFDM Systems", NTT Access Network Service Systems Laboratories, 1999, pp. 279-283.

Y. Zhao and A. Huang, "A Novel Channel Estimation Method for OFDM Mobile Communication Systems Based on Pilot Signals and Transform-Domain Processing", Helsinki University of Technology, 1997, pp. 2089-2093.

G. Cariolara and F. C. Vagliani, "An OFDM Scheme with a Half Complexity", IEEE Journal of Selected Areas in Communications, vol. 13, No. 9, Dec. 1995, pp. 1586-1599.

P. H. Moose, "A Technique for Orthogonal Frequency Division Multiplexing Frequency Offset Correction", IEEE Transactions of Communications, vol. 42, No. 10, Oct. 1994, pp. 2908-2914.

J. Heiskala and J. Terry, Ph. D., "OFDM Wireless LANs: A Theoretical and Practical Guide", Sams Publishing, (2002), pp. 1-315.

* cited by examiner

CHANNEL ESTIMATION AND COMPENSATION TECHNIQUES FOR USE IN FREQUENCY DIVISION MULTIPLEXED SYSTEMS

FIELD OF THE INVENTION

The present invention is directed to methods and apparatus for implementing frequency division multiplexed systems, e.g. orthogonal frequency division multiplexed (OFDM) systems and, more particularly, to improved methods and apparatus for performing channel estimation and channel compensation operations in such systems.

BACKGROUND OF THE INVENTION

Frequency division multiplexed communications systems transmit many, sometimes upwards of thousands, of carrier signals, simultaneously to communicate information. Transmitted carrier signals are sometimes referred to as tones. In the case of OFDM systems the transmitted tones are orthogonal to each other to thereby avoid or minimize mutual interference. In an OFDM system, each tone may be used to transmit a different unit of data, e.g., symbol, in parallel.

For each transmitted carrier signal, an OFDM receiver normally attempts to compensate for the distortion induced by the transmission channel. This will normally involve a channel estimation operation and a channel compensation operation. To assist a receiver in overcoming multipath distortion, pilot signals with known data patterns are transmitted. The pilot signals, sometimes called pilot tones or simply pilots, are used to support channel estimation operations. Such channel estimation operations normally attempt to estimate the amplitude and phase distortion introduced by the communications channel.

The pattern structure of the pilots can be in essentially any manner, provided that the Nyquist sampling criteria for the communication channel's impulse response and rate of change are satisfied. The number of pilots transmitted is often a function of the expected multipath distortion delay and the anticipated rate of change in channel conditions. However, for purposes of efficiency, it is desirable to minimize the number of pilots transmitted since the transmission of a pilot precludes the transmission of data in the transmission slot used to transmit the pilot.

FIG. 1 is a chart 100 which provides a simple example of a pilot pattern that is typical of an OFDM signal. In FIG. 1, the horizontal axis corresponds to frequency with each rectangle in a row corresponding to a different tone of an OFDM signal. While twenty-five tones are shown, any number, e.g., thousands, of tones may be transmitted in parallel as part of an OFDM signal during a single symbol time period. In the FIG. 1 example, the vertical axis corresponds to time as measured in terms of symbol time periods. One symbol, e.g., a QAM symbol, is transmitted per symbol time period using each tone.

Pilots 102 are represented in FIG. 1 as dark dots. They are distributed in frequency and time in the illustrated grid representation. In the FIG. 1 example, pilots are transmitted during every other symbol transmission period. Accordingly, there are symbol transmission periods during which no pilots are transmitted or received. In such an implementation, during some symbol periods, no pilot tones are received.

The received known pilot signals are used to estimate the channel distortion at the time and frequency of each pilot. For each OFDM tone a channel estimate is normally required for channel compensation purposes. Thus, where no pilots are located, e.g., for each frequency/time slot used to transmit data as opposed to a pilot tone, a channel estimate needs to be generated. Pilots for these frequency/time slots are normally generated using interpolation on the received pilots in the time and/or frequency domain. In such systems two dimensional, or two independent interpolations, across frequency and time may be performed to fill in the missing pilots used to provide channel information. An exemplary pilot interpolation process is shown in FIG. 2, with interpolation being performed across the frequency domain using pilots represented by arrows 208 received during the same symbol time period.

The pilot interpolation can be performed using a number of known techniques. One can perform a simple linear interpolation between pilot data points or more sophisticated cubic interpolation. Perhaps the most popular approach to "filling in the gaps" between pilot "bins" is to perform a low pass filtering (LPF) operation on the received pilot data points. In the context of the present application a "bin" represents data or a set of data corresponding to an individual carrier frequency (tone). Accordingly, when processing an OFDM signal having M tones, M bins will normally be used. The LPF interpolation process not only fills in the data between the pilot bins, but also allows for noise reduction due to the LPF operation. FIG. 2 illustrates an example of the result of low pass filtering to interpolate between pilot data points to generate a complete set of channel estimation information for one symbol time period. The FIG. 2 illustration may be the result of, e.g., performing interpolation on the pilots of the first row of data shown in FIG. 1. In the FIG. 2 example, each dot corresponds to an interpolated value at a carrier frequency. In the FIG. 2 example valleys such as the valley 204 correspond to carriers where there is low channel noise while the peaks 202, 206 correspond to carriers where the channel has relatively high noise.

Unfortunately even with pilots spaced close enough in frequency and time to meet the channel's Nyquist criterion, filling in the channel estimate between the known pilot bins is still prone to error due to additive noise. Known channel estimation techniques attempt to solve this problem in the following manner. The OFDM symbols are received, the pilots are extracted, then averaged over many OFDM symbols. Once sufficient averaging in performed providing a reduction in noise corruption, the channel is interpolated between the pilots. The received signal on a given channel is then multiplied by the inverse of the corresponding channel estimate in an attempt to remove multipath and/or other distortion introduced by the communications channel.

This known technique works well except that it depends on a relatively long integration time to reduce the noise corruption. This delay, due to the need to average multiple pilot tones before a reliable channel estimate is generated, is undesirable since it increases the time between when a carrier recovery signal lock is first achieved and when received symbols may be decoded in a reliable manner.

In view of the above discussion, it is apparent that there is a need for methods and apparatus which can be used to reduce the amount of time required to produce reliable channel estimates in frequency division multiplexed systems. From a transmission efficiency standpoint, it is desirable that at least some of the methods and apparatus be capable of reducing the amount of time required to produce reliable channel estimates without requiring the transmission of more pilot tones then are transmitted in the known systems.

SUMMARY OF THE INVENTION

The present invention is directed to methods and apparatus for performing channel estimation and channel compensation operations in frequency division multiplexed communications systems such as OFDM systems.

The methods and apparatus of the present invention make novel use of single carrier channel estimation techniques and applies them in a unique and novel manner to multi-carrier signals such as OFDM signals, in combination with existing multi-carrier channel estimation techniques. This has the potential of providing for faster recovery of data in a received signal than is possible using known multi-carrier techniques alone.

The method of the present invention utilizes in a novel way the known Constant Modulus Algorithm (CMA) and various other channel estimation update techniques including a reduced constellation decision directed updating technique, and a full decision directed updating technique. The channel estimation update techniques of the present invention, which are applied on a per carrier basis, are used to speed convergence of channel estimates.

The method of the present invention uses the CMA as implemented as part of a constant modulus channel estimate update method to clean up channel estimation corresponding to independent OFDM carriers. On first detection of the pilots, one performs a low pass filtering of the pilot data to interpolate values for which pilot tones were not received. Channel estimates are then generated for each of the received and interpolated pilots.

As is known in the art, one or more symbol transmission periods may pass between the receipt of each set of pilots. In accordance with the present invention, while the receiver is waiting for the next group of pilots to be transmitted, following the initial group of pilots, the receiver uses the constant modulus channel estimate update method and/or other techniques in conjunction with the first pilot estimate (which has a tendency to be noisy) to separately update the channel estimate for each OFDM carrier.

In accordance with the present invention, a separate signal noise measurement, e.g., a signal to noise ratio (SNR) measurement, is made for each data carrier (tone). After receipt of the first set of pilots, the noise measurement is used, on a per carrier basis, to determine which of a plurality of techniques should be used to update the channel estimate for the individual carrier.

In various embodiments, the signal noise measurement is compared to various thresholds that are used to determine the channel estimate update method to be used. Based on the results of the comparison between the signal noise measurement and the threshold or thresholds used to select the channel estimate update method, in various embodiments, over time, the utilized channel estimation update technique will be switched from a pilot interpolation technique, to a CMA based technique, to a reduced constellation decision directed updating technique and, finally, to a full decision directed adaptive updating technique. Various embodiments implement a subset of the discussed update methods while other embodiments use all the discussed update methods. Other methods for correcting amplitude errors and/or both amplitude and phase errors can also be used in accordance with the invention.

Since the selection of the update method to be used is performed on a per carrier basis, the channel estimation update method being used may vary from tone to tone depending on the signal noise measurement for the tone at any given time. In addition, for tones where low signal noise measurements are rapidly obtained, some or all of the intermediate update techniques discussed above may be skipped over with the full decision directed update technique being employed relatively quickly.

The constant modulus channel estimation update method provides update information regarding the amplitude portion of the channel estimate but not the phase portion. Decision directed, e.g., sliced error based, update methods provide both amplitude and phase channel estimate update information.

To reduce the risk of channel estimation errors, after pilot interpolation and CMA updating, as part of the reduced constellation update method employed, updates are performed using the inner and/or outer most data symbols which tend to have greater phase certainty than received symbols determined to correspond to one or more intermediate constellation (symbol amplitude) rings.

After the data carrier is sufficiently equalized as indicated by the signal noise measurement being below a preselected threshold, the updating of the channel estimate and corresponding channel compensation filter, is increased to use the entire symbol constellation, i.e., the channel compensation filter is update based on a sliced error regardless of where the received symbol is determined to occur in the constellation of possible symbol values.

The methods and apparatus of the present invention, which relay on more then just pilots to update the channel compensation filters, lead to faster convergence of the channel compensation filter for each tone and therefore typically reduces the amount of time before received symbols become usable.

Additional features, embodiments and advantages of the methods and apparatus of the present invention are discussed in the detailed description which follows.

DETAILED DESCRIPTION

As discussed above, the present invention is directed to methods and apparatus for updating channel estimates and for using channel estimates in frequency division multiplexed systems, e.g., OFDM systems. The invention can be used in various types of frequency division multiplexed receivers including, e.g., OFDM television receivers, fixed wireless receivers, broadband wireless communications devices, etc.

Figure 3:
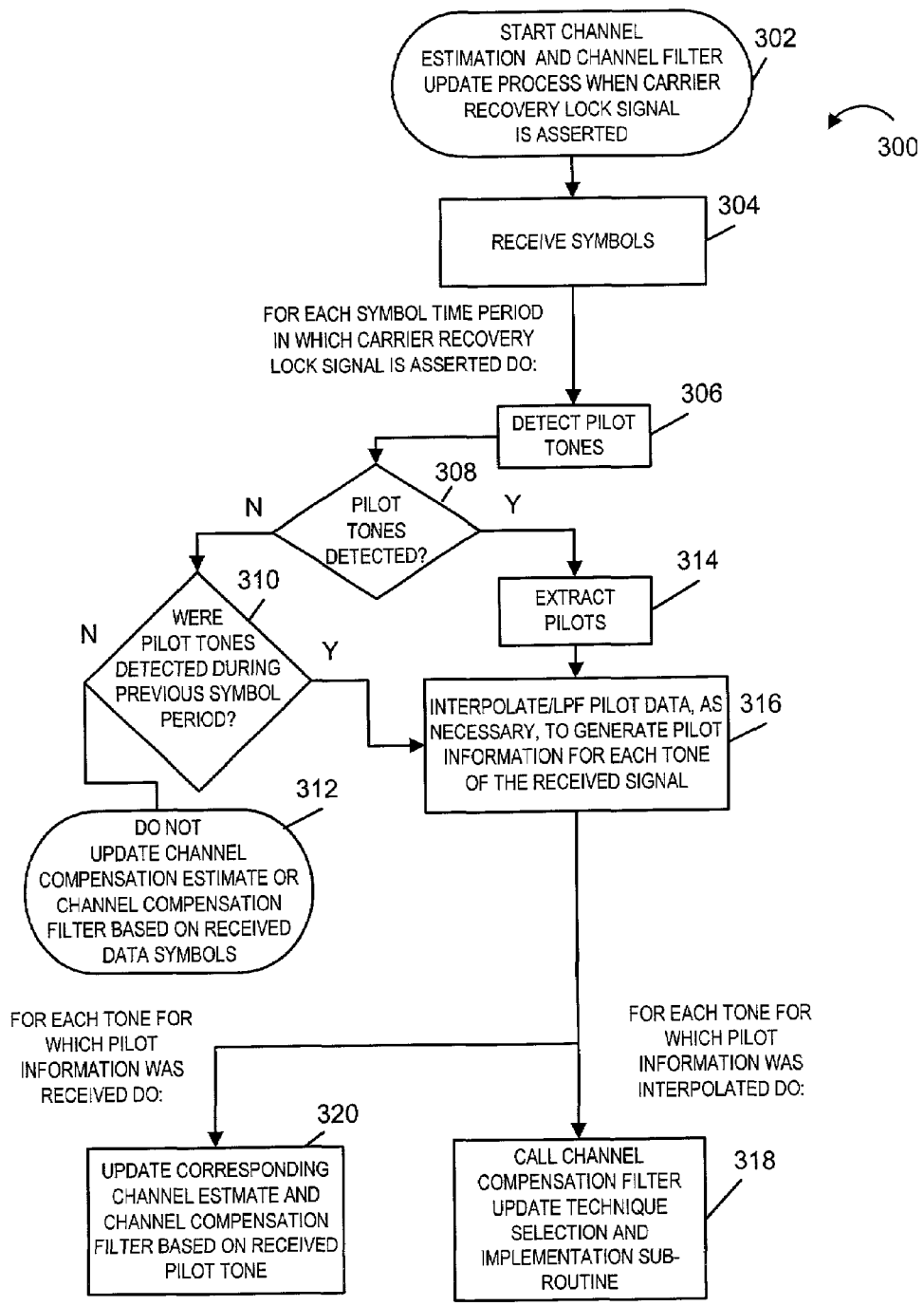
FIG. 3 illustrates the steps of a channel compensation filter update method of the present invention.
Figure 4:
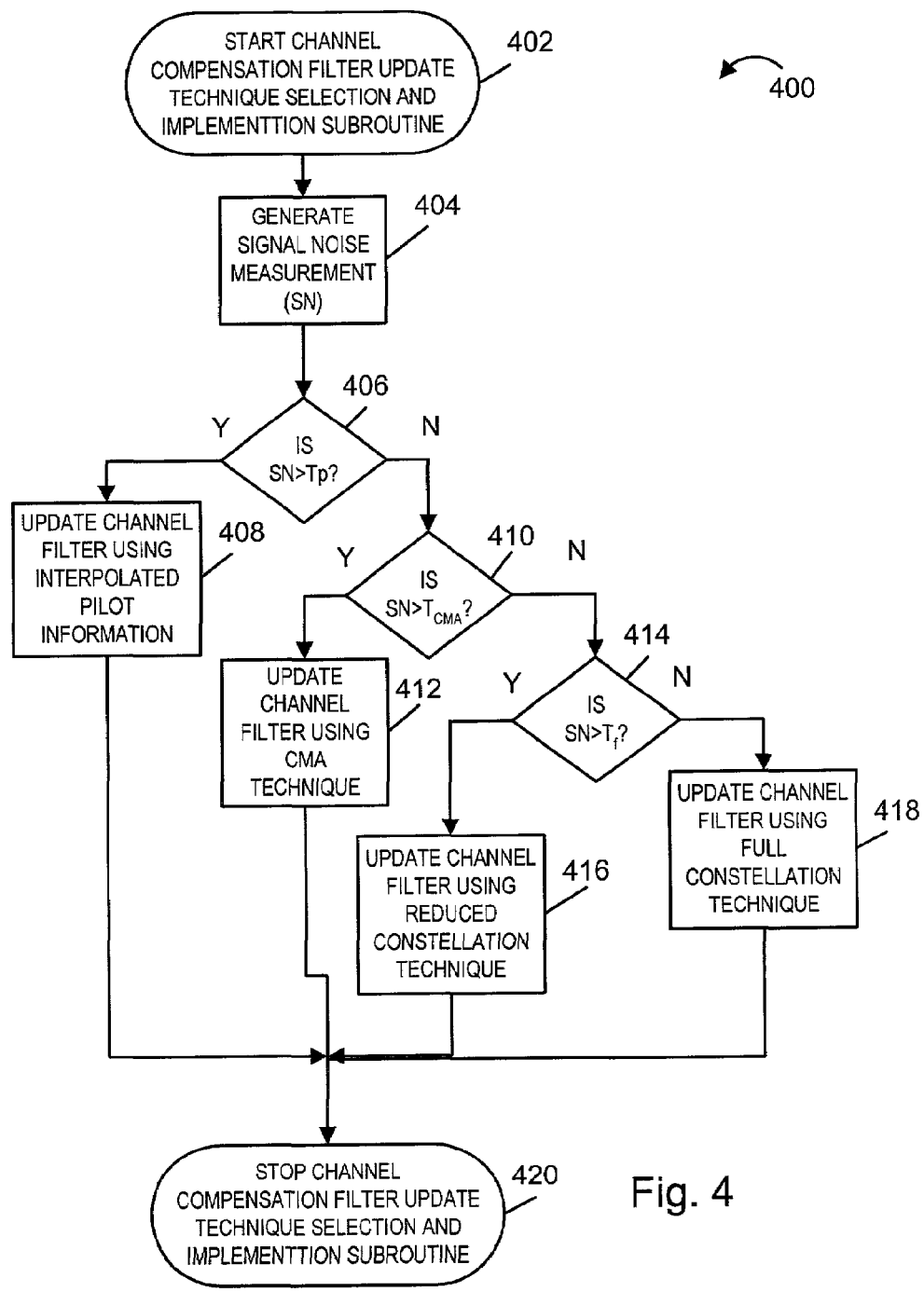
FIG. 4 illustrates the steps of a channel compensation filter update method selection and implementation subroutine.
Figure 5:
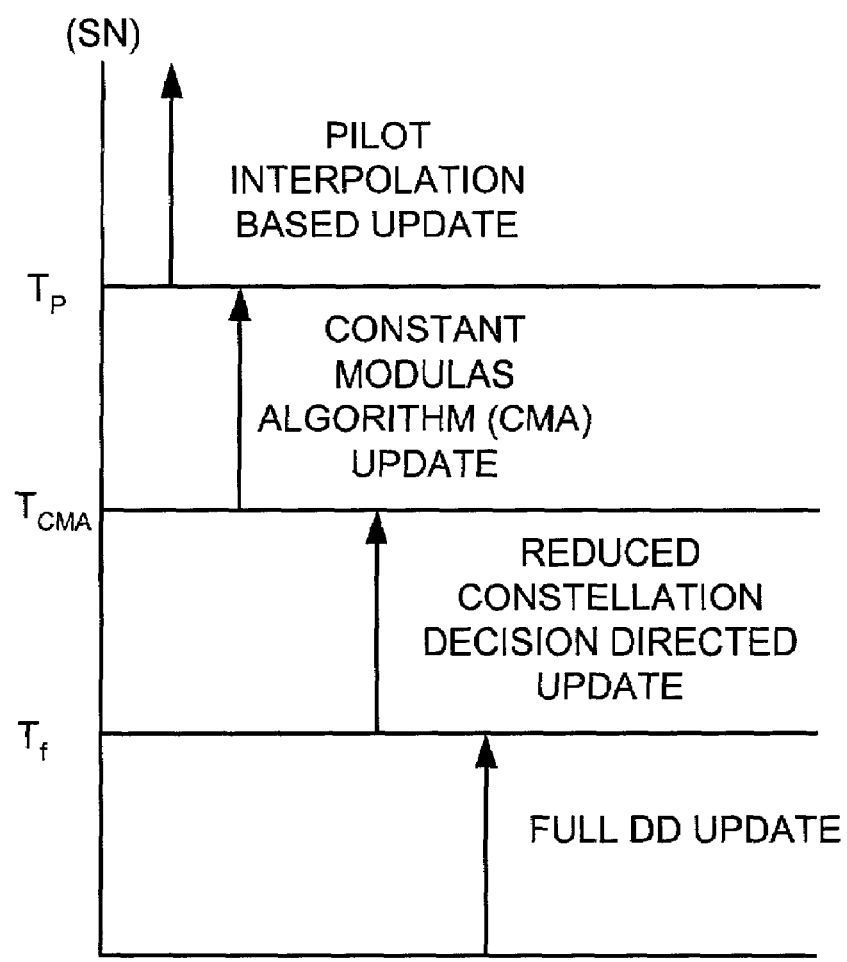
FIG. 5 is a chart illustrating various signal noise measurement thresholds and the corresponding channel compensation filter update method to be selected based on a comparison of a detected signal noise level to one or more of the various thresholds.

The method of the present invention will now be explained with reference to FIGS. 3 and 4. FIG. 3 is a flow chart 300 that illustrates the steps associated with the channel estimation and channel filter update process of the present invention. As illustrated, the method begins in step 302, when a lock signal is asserted indicating that the receiver has reached a state sufficient to distinguish between different received symbols in a reliable manner. In step 304, symbols are received, e.g., one symbol per OFDM tone during each symbol time period.

Operation proceeds from step 304 to step 306. Step 306 is the start of processing which is performed on each set of symbols received in a symbol time period. As noted above, individual tones can be used to transmit pilots (pilot symbols) or data symbols. During individual symbol periods, all, some, or none of the tones may be used to transmit pilots. In many cases, some symbol periods will include no pilots and data symbols will be transmitted using each tone, one symbol being transmitted per tone.

In step 306, the received OFDM signal is analyzed to detect what, if any, pilots are present. Operation then proceeds to step 308. In step 308 a determination is made as to whether any pilot tones were detected in the previous step. If no pilots were detected operation proceeds to step 310. In step 310, a determination is made as to whether or not pilot tones were detected during a previous symbol period. Thus, in step 310, a check is made as to whether or not at least one set of pilots, from which initial channel estimates could be generated, have already been detected. If the answer to the inquiry in step 310 is no, indicating that initial channel estimates do not exist, operation proceeds to step 312 where processing of the current set of received symbols stops without channel estimates being generated and without the channel compensation filter being updated.

If in step 310 it was determined that pilot tones had been detected during a previous symbol period, indicating that at least an initial channel estimate had been generated, operation proceeds from step 310 to step 316 which will be discussed in detail below.

In step 308, when it is determined that one or more pilot tones were detected in the current set of symbols being processed, operation proceeds to step 314. In step 314, the pilots are extracted from the current set of symbols. With the pilots extracted, operation proceeds to step 316.

In step 316, pilot information, for tones for which pilots have not been received during the current symbol time period, is interpolated from pilots corresponding to other tones of the current symbol period and/or pilots received during a preceding symbol time period. Thus, using known techniques, pilot interpolation is performed in the frequency and/or time domain to generate pilot information for those tones for which pilot information was not received.

With the completion of step 316, pilot information is available for each of the tones in the received signal. Channel estimation and compensation for each tone is performed separately from the corresponding received pilot or interpolated pilot information.

For those tones for which pilots were received in the current symbol period, operation proceeds from step 316 to step 320. In step 320, the channel estimate and the channel compensation filter corresponding to the tone being processed are updated based on the received pilot corresponding to the tone for which the update is being generated.

For those tones where pilot information was interpolated for the current symbol period in step 316, operation proceeds to step 318 as opposed to step 320. In step 318, a call is made to a channel compensation filter update method selection and implementation sub-routine such as the routine 400 shown in FIG. 4.

The channel compensation filter update method selection and implementation sub-routine 400 begins in step 402 in response to being called, e.g., in step 318. Routine 400 is implemented on a per tone basis, e.g., it is executed to process the pilot information corresponding to one tone. To perform the processing associated with multiple tones of an OFDM signal, sub-routine 400 may be executed in parallel or sequentially, once per tone.

For purposes of explanation, the tone which is to have its channel estimate and channel compensation filter updated through execution of the routine 400, will be called the "current tone".

As discussed above, in accordance with one feature of the present invention, the method used to update the channel estimate and channel compensation filter in the case of interpolated pilot information is determined as a function of a signal noise measurement. In step 404, a signal noise measurement is generated for the current tone. The signal noise (SN) measurement may be, e.g., a signal-to-noise (SNR) ratio measurement. This may be generated for the tone using known SNR measurement techniques.

The signal noise (SN) measurement, e.g., SNR value, is compare in step 406 to a first threshold, Tp, used to determine if an interpolated pilot information channel estimate and compensation filter update method should be used. If SN is greater than Tp, operation proceeds to step 408 wherein the channel compensation filter is updated using a pilot interpolation based update technique. Operation proceeds from step 408 to step 420.

However, if SN is less than or equal Tp, operation proceeds to step 410 where SN is compared to a second threshold, $T_{CMA}$, which is used to determine if a constant modulus based method should be used to update the channel estimate and the compensation filter.

If, it is determined in step 410 that SN>$T_{CMA}$ operation proceeds to step 412 wherein the channel compensation filter is updated using the constant modulus based method. As is known in the art, the constant modulus algorithm implemented as part of the constant modulus method provides a mechanism where errors in the amplitude, but not phase, of received symbols is estimated. The error estimate is a form of channel estimate since the error is presumable introduced by the communications channel. In accordance with the present invention, the estimated amplitude error is used to modify the weights of the channel compensation filter for the tone being processed. In this manner, in step 412 the channel compensation filter is updated using CMA techniques. Operation proceeds from step 412 to step 420.

If SN is less than $T_{CMA}$ operation proceeds from step 410 to step 414. In step 414 SN is compared to a third threshold, $T_f$, to determine if a reduced constellation or full constellation decision directed update technique should be used to update the channel compensation filter. In both the reduced and full constellation decision directed update techniques, the update is based on an error, e.g., difference, between a sliced symbol value and a received symbol value. The sliced symbol value is the value, from a set of potential symbol values (e.g., a symbol constellation), determined to most closely correspond to the received symbol value. In cases of noise, the sliced symbol value may differ from the transmitted symbol value.

Figure 7:
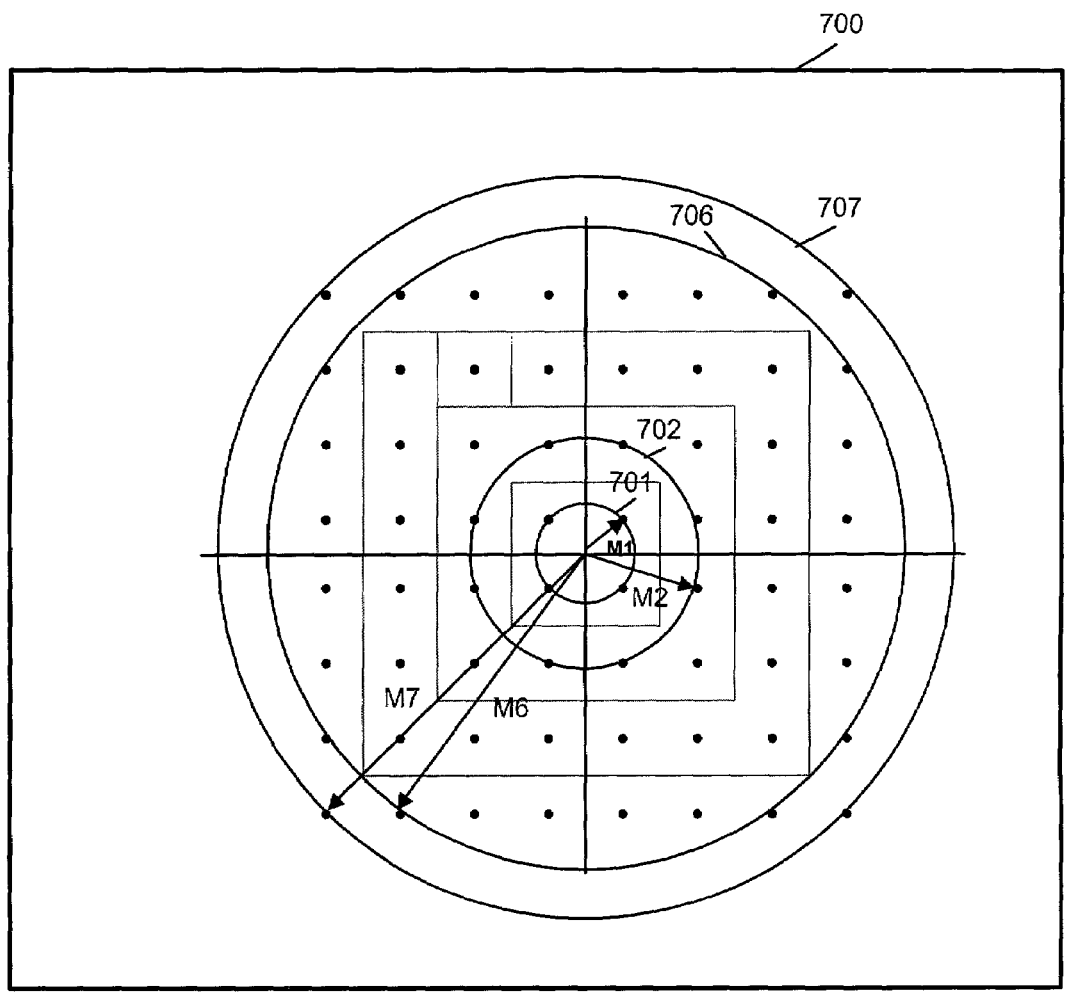
FIG. 7 illustrates an exemplary 64 QAM signal constellation which may be used in generating and broadcasting symbols which can be received by an OFDM system of the present invention.

Slicing errors due to phase errors are more likely to occur the smaller the phase difference is between potential symbol values of the same magnitude. Consider for example, the case of the exemplary 64 QAM signal shown in FIG. 7. FIG. 7 which shows a typical plot of a 64 QAM signal where phase and amplitude correspond to the horizontal and vertical axis, respectively. The 64 symbols represented by dots correspond to 7 different rings determined by potential symbol magnitudes. For example, on the first ring 701 defined by magnitude M1 there are four symbols. On the second ring 702 defined by magnitude M2, there are 8 symbols. On the second from outermost ring defined by magnitude M6 706, there are 8 symbols. However, on the outermost ring defined by magnitude M7 707 there are, as in the case of the innermost ring 701, only 4 symbols. Accordingly, from FIG. 7 it can be seen that the greatest phase certainty with regard to symbol decisions occurs on the innermost and outermost rings 701, 707. Use of the outermost ring has the additional advantage of a relatively large signal magnitude M7 which reduces the risk of decision errors in regard to the effects of signal noise on the signal's amplitude.

The reduced constellation decision directed update method limits updates to symbols which have been sliced, e.g., found to correspond to, a subset of the full set of possibly transmitted values, e.g., symbols. In one embodiment, the updates using the reduced constellation method are performed when the received symbol has been determined to correspond to the inner most or outer most ring 701, 707 of the symbol constellation being used. In another embodiment, a decision directed update is not performed if the received symbol is sliced to a value on a ring other than the outermost ring 707. The full constellation decision directed update technique, is used when signal noise is determined to be relatively low, e.g., in comparison to the signal strength thereby providing a high degree of confidence with regard to symbol decisions regardless of the ring to which the sliced symbol corresponds.

If SN>$T_f$, operation proceeds to step 416 wherein the channel filter is updated using a reduced constellation decision directed update technique. In accordance with such a method and the present invention, if the received symbol is found to correspond to the outermost or, in some embodiments, one of the outermost or innermost rings of the constellation of potential transmitted symbol values, the difference (e.g., sliced error) between the received symbol value and a decision (e.g., sliced symbol value) based on the received symbol, is used to update the channel estimate and compensation filter in terms of both amplitude and phase. Operation proceeds from step 416 to step 420.

If in step 414, the signal noise was determined not to be greater than $T_f$, indicating there is relatively little signal noise and a high degree or certainty with regard to symbol decisions, operation proceeds to step 418. In step 418 the channel estimate and channel compensation filter are updated using a full constellation decision directed update method. That is, in step 418 sliced error values are used to update the channel filter in terms of both phase and amplitude regardless of which symbol in the constellation is received. Operation proceeds from step 418 to step 420.

In step 420, the channel compensation filter update method selection and implementation sub-routine is halted until being called again to processes a symbol corresponding to another symbol time period or a symbol corresponding to a different tone but the same symbol time period as the symbol which was just processed.

As a result of the use of thresholds in the method 400, one of a plurality of channel estimation and filter update methods may be used. FIG. 4 shows the different thresholds and the corresponding update method decision for different signal noise (SN) measurements, e.g., different signal to noise ratios. Note that when SN is above threshold $T_p$, a pilot interpolation based channel estimate update method is used. Between $T_p$ and $T_{CMA}$ the constant modulus algorithm update method is used. Between $T_{CMA}$ and $T_f$ a reduced constellation decision directed update method is used and, finally when SN is below $T_f$, a full constellation decision directed update method is used.

Figure 6:
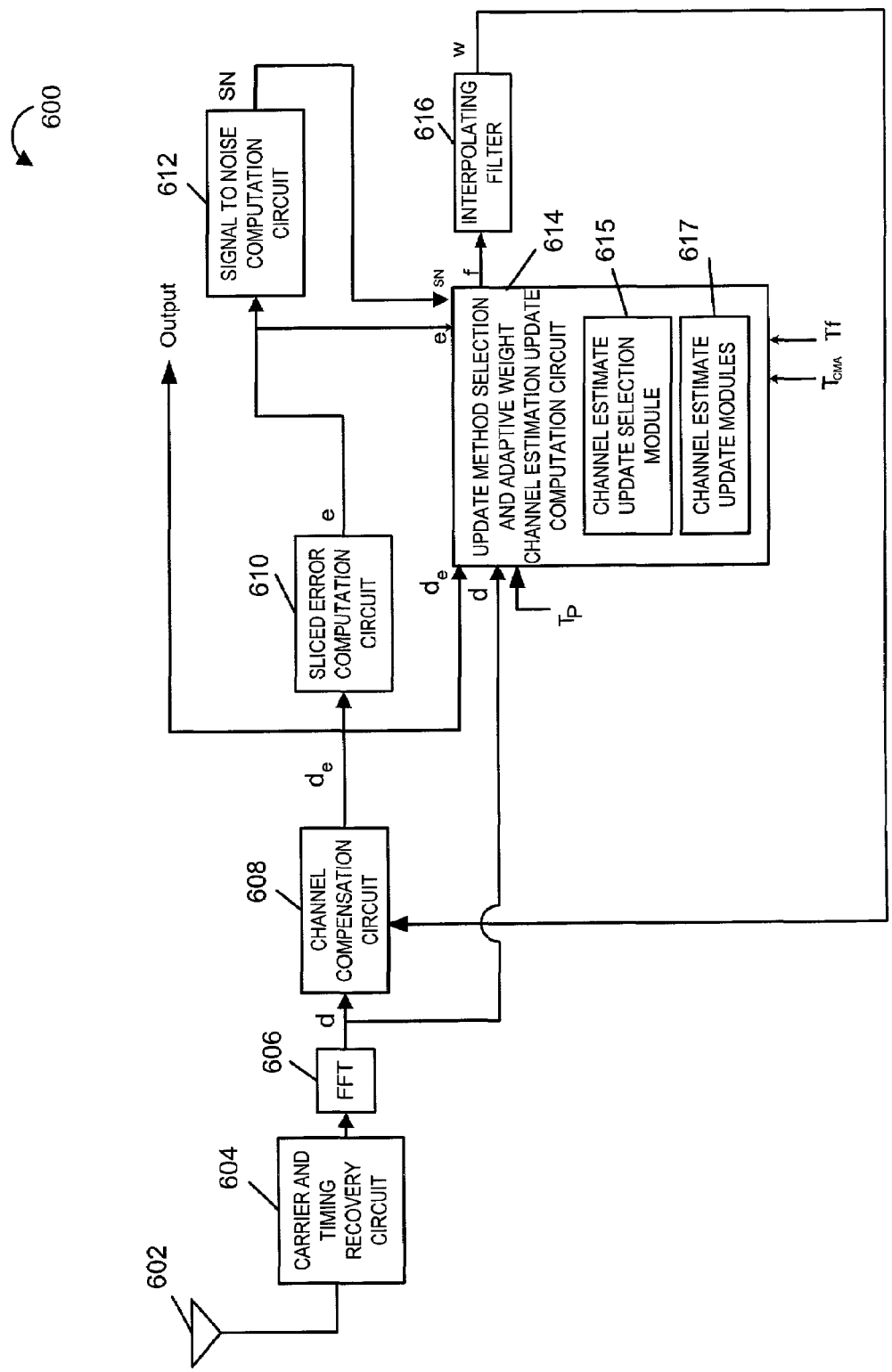
FIG. 6 illustrates an exemplary OFDM receiver which implements the channel estimation and channel compensation filter techniques of the present invention.

FIG. 6 is a block diagram of a receiver 600 that includes circuitry for implementing the channel estimation and compensation methods of the present invention. The receiver 600 includes an antenna 602, carrier and timing recovery circuit 604, FFT 606, channel compensation circuit 608, sliced error computation circuit 610, a signal to noise computation circuit 612, update method selection and adaptive weight channel estimation update computation circuit 614 and an interpolating filter 616 coupled together as shown in FIG. 6.

In the system 600, OFDM signals are received via antenna 602 and then subjected to a carrier and timing synchronization process. As part of the timing recovery process, the circuit 604 may generate a lock signal which is asserted when timing recovery has sufficiently stabilized to distinguish between different symbol periods with reasonable certainty. The processing performed by the carrier and timing recovery circuit 604 ensures that each channel within the OFDM signal will be orthogonal to each other.

The signal output by circuit 604 is subject to a fast fourier transform operation by FFT circuit 606. In this manner, the OFDM signal is divided into the various tones which comprise the OFDM signal. Each tone corresponds to a different bin used for processing. The data (d) from the FFT is multiplied in channel compensation circuit 608 (bin by bin) by a corresponding correcting term (e.g., the inverse of the channel estimate) that is generated by the interpolated channel inverse data (w). Thus, in circuit 608 each received tone is subject to the inverse of the channel estimate for the corresponding tone. The corrected channel data ($d_e$) is sent to other sections for forward error correction (FEC) processing (output) and also used to close the adaptation loop which includes elements 610 612, 614 and 616. The adaptive procedure used to generate and correct channel estimates in the case of interpolated pilot values is one of the features of the invention.

Figure 1:
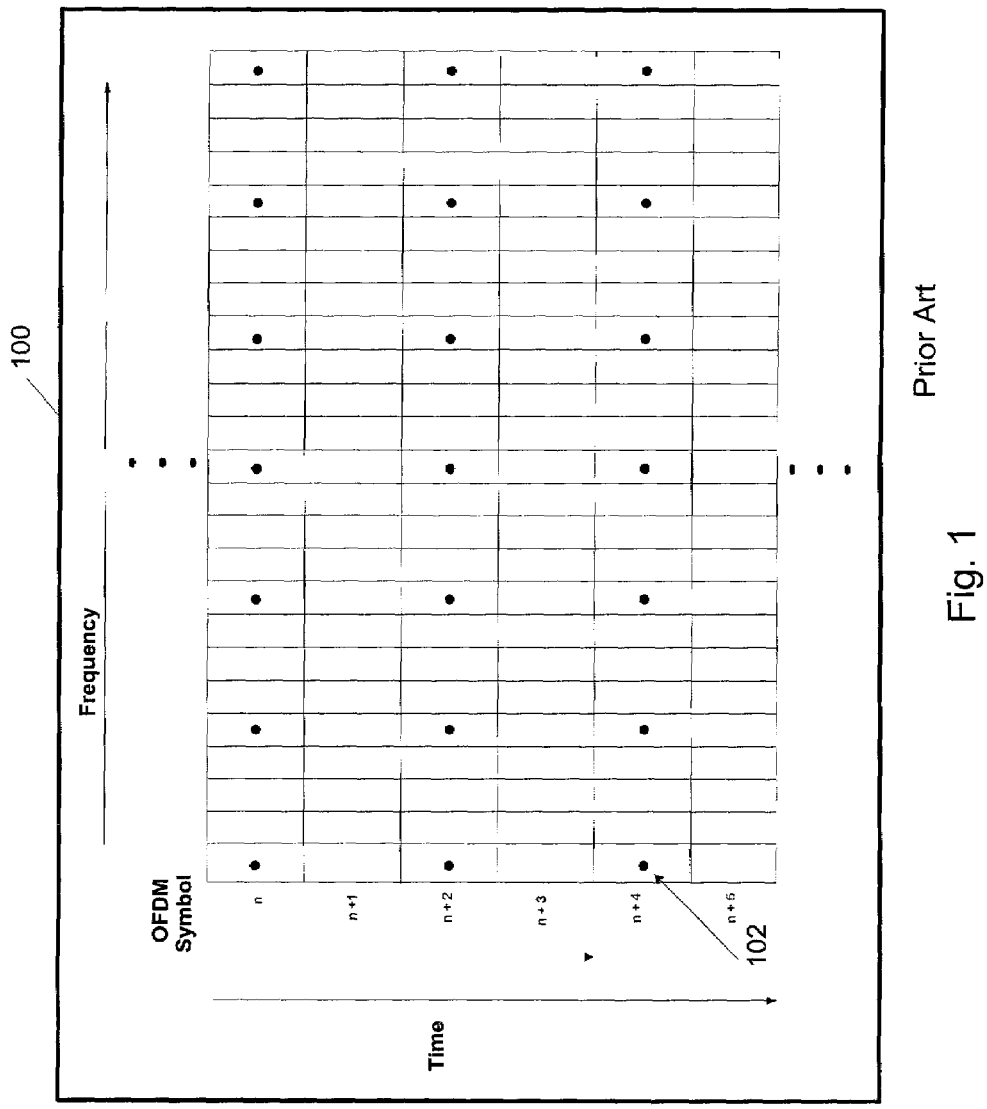
FIG. 1 is a chart which provides a simple example of a pilot transmission pattern that is typical of an OFDM signal.
Figure 2:
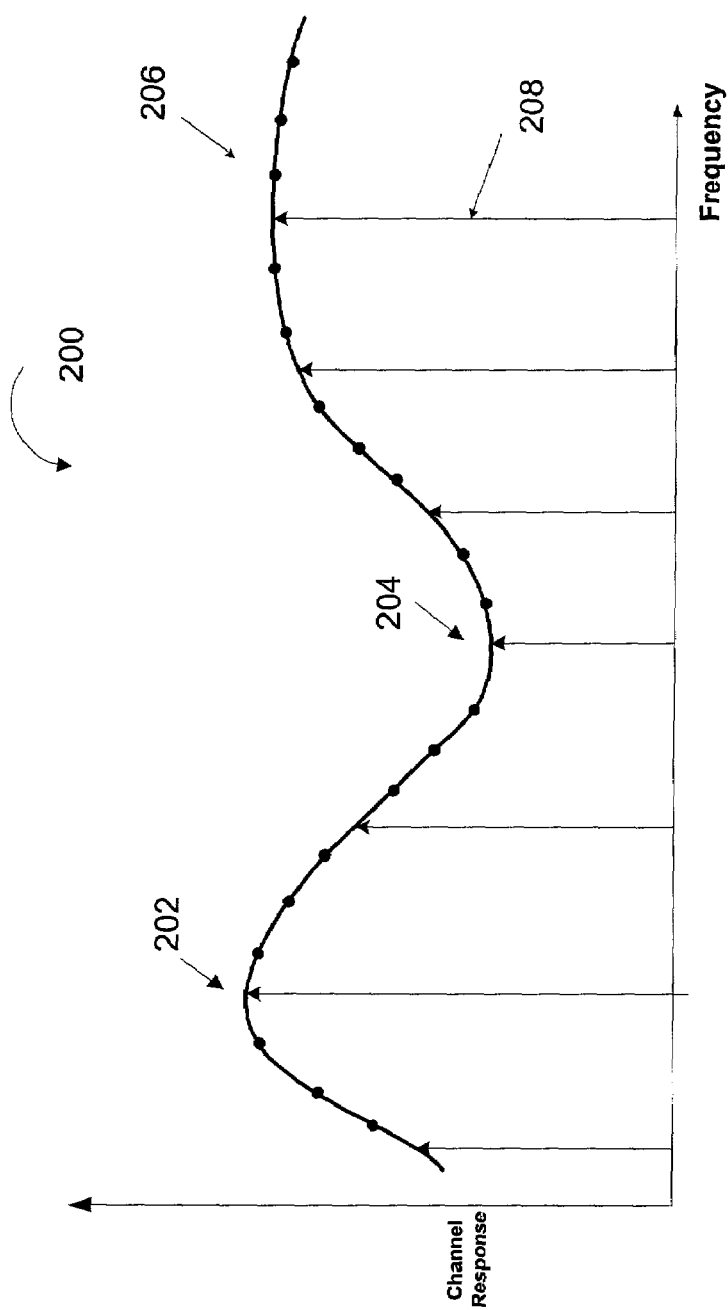
FIG. 2 is a channel response vs. frequency plot illustrating channel response information determined from pilot tones and from interpolating between the received pilot tones.

During initial acquisition which is up to and including the symbol time period in which pilots are first received, symbol values may be unreliable. For this reason, during initial acquisition the initial channel estimate is generated from the first set of received pilots with their known transmitted values. During this phase, in one exemplary embodiment, an adaptive estimate of the channel at the location of the pilot bins is calculated as follows:

$$H(n)=H(n-1)+G*e* \operatorname{conj}(d)$$

Where G is a adaptive gain, e is the sliced error and conj(d) is the complex conjugate of the input data (d) to the adaptive filter 614. This calculation is done on every pilot bin, over multiple OFDM symbols. After the channel inverse (e.g., inverse of the channel estimate) has been computed for some or all the tones, the data between pilot FFT bins is interpolated (w) as shown in FIG. 2. At this point all OFDM bins have an initial (approximate) channel estimate that can be used for channel compensation. The interpolated channel inverse is fed to the channel compensation block 608 to close the adaptive feedback loop.

The invention differs from other techniques in how the data bins are adjusted when pilots are not received. The standard technique is to continue to average the pilot bins until a good enough interpolation can be made for the data bins used to control channel compensation circuit 608. This unfortunately takes a long time to average out the additive noise.

In accordance with the present invention, single carrier techniques are applied to multi-carrier systems to expedite the channel estimation processes during periods of time when pilots are not received for one or more individual tones.

CMA is a well know adaptive algorithm that has been applied to single carrier systems for many years. Also known as a blind algorithm since it does not depend on knowledge of transmitted data points, just its statistics. In the FIG. 6 example, each FFT bin is considered as separate single carrier signals, allowing one to apply the CMA algorithm on a bin by bin basis thereby permitting channel estimate updates in even in the absence of pilot tones. The CMA algorithm for updating channel estimates is defined as follows:

$$cme = \text{MODPWR} - |de|^2;$$

$$H(n) = H(n-1) + G*d* \text{ conj}(de)*cme;$$

Where G is the CMA gain, d is the input data samples, de are the adaptive output samples, MODPWR is the modulus power of the constellation used for a particular bin. The Modulus power is defined as $$\text{MODPWR} = E[|d|^4]/E[|d|^2]$$

The algorithm used in the FIG. 6 embodiment estimates the noise power on each OFDM FFT bin and determines when the utilized algorithm should be switched from pilot interpolated channel estimates, to CMA adaptation. Further processing allows the algorithm, as signal noise is reduced, e.g., due to improved channel compensation, to continue refining the adaptation from using the CMA, to reduced constellation adaptation, to full data aided adaptation.

In one embodiment, the update method selection and adaptive weight channel estimation update computation circuit 614 includes a control module 615 used for selecting, as a function of noise power, which method should be used to update the channel estimate. In addition to the control module 615, the circuit 614 includes a plurality 617 of channel estimate update modules, one module per supported channel estimate update method, e.g., a CMA channel update module, a reduced constellation channel update module, and a full data aided adaptation channel update module. The module used to generate the channel estimate update at any given time is selected by the control, i.e., channel estimate update selection module 615.

The noise power, which is used to determine the switching points, is computed by slicing received data to produce the sliced error (e) and computing the average error on a per bin basis. The equation is as follows $$\text{Noise\_power} = (Bq - Pq)^2 + (Br - Pr)^2$$

Where Bq and Br are the imaginary and real components of the received signal, Pq and Pr are the imaginary and real components of the expected received data points. For pilot noise calculations Pq is typically 0. In typical constellation mappings, OFDM data symbols are scaled to have equal spacing between each symbol. For ease of explanation, we will assume constellation points are on a representative grid of +/−1, +/−3, +/−5 etc.

In the FIG. 6 embodiment, after initial pilot based channel estimation, the noise power is measured on a bin by bin basis. As the pilot based channel estimate is computed, the additive noise reduces (more averaging yields better accuracy of the channel and its inverse), yielding a better channel estimate. As the noise in each FFT bin drops below a certain threshold (Tp), that respective FFT bin switches to the CMA algorithm described above. Due to differences in noise between different tones, some FFT bins may switch to the CMA earlier than others due to the nature of the channel creating high and low SNR reception across the OFDM signal bandwidth.

While the CMA algorithm cleans up multipath distortion based on the envelope (amplitude) of the signal, it unfortunately yields no information concerning phase. The result is that each FFT bin that is under CMA adaptation will have the correct amplitude correction, but no phase correction. This can lead to phase ambiguities in the bins that are under CMA adaptation. Fortunately the phase error is usually not too large since the initial estimate is determined from the interpolated pilot data.

By switching to a reduced constellation decision directed update technique the phase ambiguity problem can be resolved since this technique has the additional benefit of providing phase correction information.

In accordance with the invention, while the channel continues be corrected by the CMA algorithm, a second noise threshold is periodically tested to determine whether a switch should be made to the reduced constellation update technique. Once the noise within each data bin drops below the second threshold ($T_{CMA}$) the update of the data bin is switched from the CMA to a decision directed reduced constellation update algorithm.

The reason a reduced constellation technique is used at this point and not a full constellation update technique is due to the fact that the CMA may alter the phase information that was originally provided by the pilot interpolation process. As the signal for the respective FFT bin is "cleaned up" via the CMA algorithm, the tendency is to create constellation arcs, reflecting the lack of phase information. To correct this problem, one can modify the CMA algorithm to take advantage of the phase information in the interpolated pilot measurements and/or use a reduced constellation, where the adaptation is continued by using only the inner most, outermost, or inner and outermost constellation points.

When the noise power drops below a third threshold ($T_f$) the constellation updating is switched to use the full constellation of data points as part of a decision directed update process.

The methods and apparatus of the present invention can be used with continuous (non-burst) OFDM signals as well as other frequency division multiplexed signals. Various applications can be to the current DVB-T standard, IEEE802.16 standard as described for the FDD OFDM mode, along with any Frequency Division Multiplex OFDM system.

Numerous variations on the above described embodiments of the present invention are possible without departing from the scope of the invention. For example, a general purpose processor, e.g., CPU, may be programmed to perform one or more signal processing operations in accordance with the method of the present invention. Notably as an alternative to fixed circuit implementations, the operations performed by the circuits illustrated in FIG. 6 may be performed using software executed by a processor. Modules which perform functions in accordance with the invention may be implemented as either software, hardware, firmware or any combination of software/hardware/firmware.

The inverse of the channel function is normally used by the channel compensation circuit which processes the incoming tone in an attempt to reverse the effect of the channel. This is because multiplying the received signal by the inverse of the channel function provides a simple way of reversing the effect of the communications channel. Accordingly, from an implementation standpoint, it is often useful to generate and express channel estimates in terms of the inverse of the channel function. Thus, from an implementation standpoint and for purposes of the present application, channel estimates can be generated, expressed, and used either as the channel function or its inverse.

What is claimed is:

1. A method of processing a frequency division multiplexed signal including a plurality of tones, the method comprising:
   receiving said frequency division multiplexed signal;
   performing a constant modulus based update operation to update a channel estimate corresponding to at least one tone of the frequency division multiplexed signal; and
   performing a decision directed channel estimate update operation to update a channel estimate corresponding to a second tone of the frequency division multiplexed signal at the same time said constant modulus based update operation is performed.

2. The method of claim 1, further comprising:
   using the updated channel estimate to perform a channel compensation operation on a portion of the frequency division multiplexed signal corresponding to said at least one tone.

3. The method of claim 1, further comprising:
   performing a reduced constellation decision directed update operation to update said channel estimate.

4. The method of claim 3, further comprising:
   performing a full constellation decision directed update operation to update said channel estimate.

5. The method of claim 4, further comprising:
   receiving, as part of said frequency division multiplexed signal, a pilot transmitted on said at least one tone; and
   using said received pilot to update said channel estimate.

6. The method of claim 1, further comprising:
   generating a signal noise measurement value for said at least one tone;
   comparing the signal noise measurement value to a first threshold; and
   selecting a channel estimate update method, as a function of the comparison of the signal noise measurement value to the first threshold, from a plurality of different channel estimation update methods.

7. The method of claim 6, wherein the plurality of different channel estimation update methods include at least one of a constant modulus based update method and an interpolated pilot value based method.

8. The method of claim 6, wherein the plurality of different channel estimation update methods include at least one of a reduced constellation decision directed update method and a full constellation decision directed update method.

9. A method of processing a frequency division multiplexed signal including a plurality of tones, the method comprising:
   receiving said frequency division multiplexed signal;
   performing a constant modulus based update operation to update a channel estimate corresponding to at least one tone of the frequency division multiplexed signal;
   generating a signal noise measurement value for said at least one tone;
   comparing the signal noise measurement value to a first threshold;
   selecting a channel estimate update method, as a function of the comparison of the signal noise measurement value to the first threshold, from a plurality of different channel estimation update methods; and
   when said comparison of the signal noise measurement value to the first threshold indicates that the signal noise measurement value does not exceed said first threshold,
   comparing the signal noise measurement value to a second threshold; and
   wherein the step of selecting a channel estimate update method is also performed as a function of the comparison of the signal noise measurement value to the second threshold.

10. The method of claim 9, wherein a reduced constellation decision directed channel estimate update method is selected when the comparison of the signal noise measurement value to the second threshold indicates that the signal noise measurement value exceeds the second threshold and wherein a full constellation decision directed channel estimate update method is selected when the comparison indicates that the signal noise measurement value is below the second threshold.

11. A method of updating a channel estimate for a carrier signal of an orthogonal frequency division multiplexed communications signal, the method comprising:
   receiving the carrier signal;
   performing a reduced constellation decision directed channel estimate update operation, using the received carrier signal, to update said channel estimate; and
   after performing said reduced constellation decision directed channel estimate update operation performing a full constellation decision directed channel estimate update operation.

12. The method of claim 11, further comprising:
   generating a signal noise measurement;
   comparing the signal noise measurement to a threshold; and
   using the results of the comparison to determine when to switch from performing said reduced constellation decision directed channel estimate update operation to performing the full constellation decision directed channel estimate update operation.

13. A method of updating a channel estimates for carrier signals of an orthogonal frequency division multiplexed communications signal, the method comprising:
   receiving the carrier signals;
   performing a reduced decision directed channel estimate update operation, for at least a first plurality of the received carrier signals of said orthogonal frequency division multiplexed communications signal; comparing a signal noise value to a threshold; and selecting for at least one of said received carrier signals, as a function of said comparison, between performing a decision directed channel estimate update operation and performing a constant modulus based channel estimate update operation; and wherein a constant modulus based channel estimate update operation is performed for one carrier signal at the same time a reduced decision directed channel estimate update operation is performed for another carrier signal.

* * * * *